United States Patent
Khan et al.

(10) Patent No.: US 8,132,113 B2
(45) Date of Patent: Mar. 6, 2012

(54) REST APPLICATION EXPLORATION

(75) Inventors: Ayub S. Khan, Cupertino, CA (US);
Nam T. Nguyen, Pleasant Hill, CA (US);
Peter T. Liu, Castro Valley, CA (US);
Srividhya Narayanan, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 855 days.

(21) Appl. No.: 11/855,442

(22) Filed: Sep. 14, 2007

(65) Prior Publication Data
US 2009/0077477 A1   Mar. 19, 2009

(51) Int. Cl.
*G06F 3/00*   (2006.01)
(52) U.S. Cl. .................................................. 715/762
(58) Field of Classification Search .................. 715/738, 715/762, 763, 810, 749
See application file for complete search history.

(56) References Cited

U.S. PATENT DOCUMENTS

| | | | |
|---|---|---|---|
| 5,987,611 A * | 11/1999 | Freund | 726/4 |
| 2004/0030740 A1 * | 2/2004 | Stelting | 709/201 |
| 2007/0260636 A1 * | 11/2007 | Baio et al. | 707/104.1 |
| 2009/0252159 A1 * | 10/2009 | Lawson et al. | 370/352 |

OTHER PUBLICATIONS

Architectural Styles and the Design of Network-based Software Architectures Dissertation, University of California, Irvine, submitted in partial satisfaction of the requirements for the degree of Doctor of Philosophy in Information and Computer Science by Roy Thomas Fielding, 2000.
Web Application Description Language (WADL), Marc J. Hadley, SMLI TR-2006-153, Mar. 2006, Sun Microsystems, Sun Labs, 16 Network Circle, Menlo Park, CA 94025.
Web Application Description Language (WADL), Marc J. Hadley, Sun Microsystems Inc., Nov. 9, 2006.

* cited by examiner

*Primary Examiner* — Thanh Vu
(74) *Attorney, Agent, or Firm* — Brooks Kushman P.C.

(57) ABSTRACT

A REST application may be explored through discovery of resources and exercising of methods. A user interface displays a graphical representation of the REST application based on a model constructed in memory. User input selects a resource. Methods associated with the selected resource are displayed. A user may select a method and provide input. A request is automatically sent to the server based on the selected method. A representation of the response to the request is displayed on the user interface, allowing the user to further explore the application.

18 Claims, 5 Drawing Sheets

REST APPLICATION EXPLORATION

BACKGROUND OF THE INVENTION

1. Field of the Invention

The present invention relates to exploring the configuration and functionality of application resources.

2. Background Art

Various styles of software architecture may be used in distributed hypermedia systems such as, for example, the World Wide Web. One such architectural style is Representational State Transfer (REST), which focuses on how components are used, including interaction constraints, data element interpretation, and the like. Typically, applications conforming to REST (or RESTful applications) are implemented as resources. Resources may define other resources and may support one or more methods. Each resource has an address such as a uniform resource identifier (URI). Clients and servers exchange representations of these resources using a standard interface such as, for example, HTTP.

A RESTful application may be described using the Web Application Description Language (WADL). A WADL description may include one or more of a set of resources, relationships between resources, methods that can be applied to each resource, resource representation formats, and the like. The set of resources typically includes one or more top-level resources. Each top-level resource may also have one or more sub-resources. Resource relationships may include both referential and causal links. Methods typically include expected inputs and outputs and their supported formats. Methods may include functionality such as post, get, put, delete, and the like. WADL may be described using the eXtended Markup Language (XML).

REST applications typically reside on servers and may be accessed by one or more remote clients. A difficulty with using REST applications arises from a lack of knowledge concerning the resources and methods supported by the RESTful application. What is needed is support for exploring REST applications.

SUMMARY OF THE INVENTION

The present invention allows exploration of a REST application through discovery of resources and exercising of methods.

In one embodiment, a client is provided for analyzing resources of a REST application residing on a server. The client may include a user interface that can display one or more of a representation of at least one resource and a list of methods associated with a resource. The resources may be displayed as one or more of a tree structure, a table, and the like. The user interface may also accept user input specifying one of the resource methods. A model of the application is held in memory. The model may be constructed as a document object model and may be constructed from a web application description language representation of the application. The client may automatically generate a request based on a specified method, send a request to the server, receive a response from the server, and display data received in the server response. If the received data includes additional resources, the user interface may display a representation of these additional resources.

In another embodiment, a graphical representation of a REST application based on a model constructed in memory is displayed on a user interface. User input specifying a resource is accepted. At least one method associated with the specified resource is displayed on the user interface. User input specifying a displayed method is accepted. A request is automatically sent to the server based on the specified method. A representation of the response to the request is displayed on the user interface.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
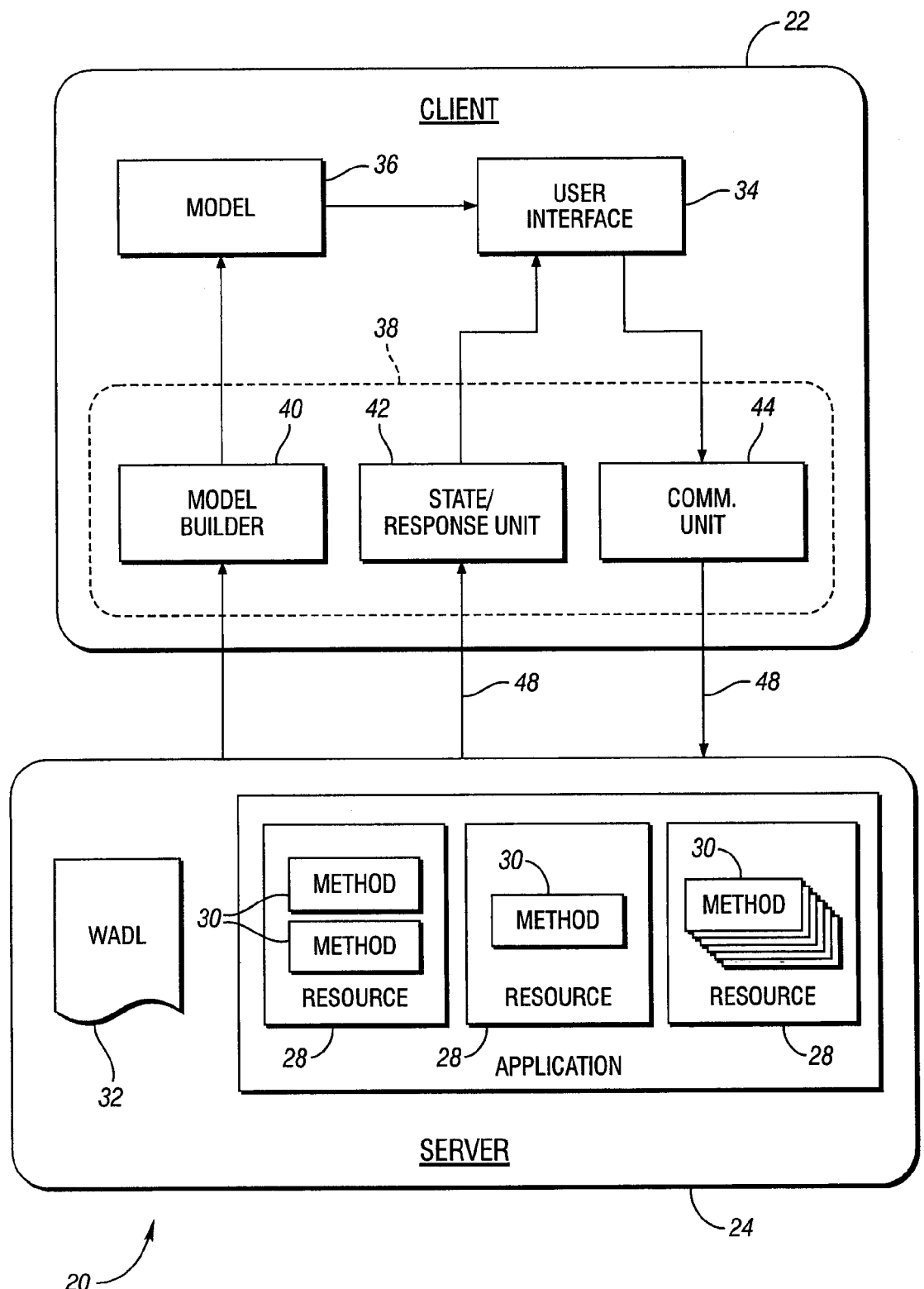
FIG. 1 is a block diagram illustrating a system including a client implemented according to an embodiment of the present invention.

Referring to FIG. 1, a block diagram illustrating a system including a client implemented according to an embodiment of the present invention is shown. A distributed system, shown generally by 20, includes at least one client 22 and at least one server 24. Server 24 provides access to at least one REST application 26. Each application 26 typically includes resources 28 with at least one resource 28 supporting at least one method 30. Resource 28 includes any information associated with application 26 that can be named or mapped, such as a document, file, image, service, a collection of other resources, a physical entity, and the like. Method 30 is an operation permitted by resource 28. One possible set of methods includes post, get, put, and delete functionality. Typically, methods are standardized and not all methods need be supported by all resources. For example, some applications or resources within applications may not support post and delete functionality for security reasons.

Server 24 includes an application representation 32 for each application 26. Application representation 32 may be implemented, for example, in a machine readable XML WADL format. An exemplary application representation follows. The characters "/", "<", and ">" have been replaced by "\", "{", and "}", respectively, to prevent imbedding hyperlinks.

---

```
{?xml version="1.0" encoding="UTF-8" standalone="yes"?}
{application xmlns="http:\\research.sun.com\wadl\2006\10"}
  {resources base="http:\\localhost:8080\music\restbean"}
    {resource path="\artists"}
      {method name="GET"}
        {request}
          {param xmlns:xs="http:\\www.w3.org\2001\XMLSchema"
type="xs:string" style="query" repeating="false" name="format"\}
        {\request}
        {response}
          {representation mediaType="application\xml"\}
        {\response}
```

```
    {\method}
    {\resource}
...
    {\resources}
...
{\application}
```

The {application} tag represents a RESTful application. In this example, resources 28 in application 26 are represented by {resource} tags. Each {resource} tag may contain {param} tags for common parameters and {method} tags for methods 30 that can be operated upon associated resource 28. Typically, method 30 includes {request} tags specifying parameters specific to that method 30. A {response} tag may specify response characteristics such as, for example, any permitted representation media.

Client 22 allows a user to explore RESTful services and/or application functionality. Client 22 may be implemented as an application. As such, client 22 may be thought of as including user interface 34, model 36, and controller 38 components. Client 22 may operate on a computer, such as a personal computer, embedded computer, PDA, workstation, and the like. Portions of client 22 may be implemented as computer instructions loaded from computer readable media as is commonly known in the art. For example, some or all of the computer instruction may be implemented using HTML and JAVASCRIPT® (ECMAScript). Client 22 may also be implemented as a standalone Swing application.

Controller 38 includes model builder 40, state/response unit 42, and communication unit 40. Model builder 40 constructs model 36 in memory based on application representation 32. Model 36 may be constructed in any of a variety of data structures such as, for example, a linked tree. Application representation is obtained from server 24 using the URI for application 26 to obtain, for example, the application.wadl file from server 24. In one embodiment, a document object model is created by model builder 40 by using a "readWADL(url)" method, which issues a get operation using XmlHttpRequest. The URL may be obtained from the user through user interface 34. In one embodiment, client 22 bootstraps itself using model builder 40.

Communication unit 44 sends requests 46 to application 26 in server 24. State/response unit 42 receives responses 48 from application 26 in server 24 resulting from requests 46. State/response unit 42 may also maintain the state of client 22 such as, for example, the state of any transaction between client 22 and server 24.

User interface 34 provides output to a user and accepts input from a user. In one embodiment, user interface 34 displays a graphical representation of some or all of resources 28 in application 26. This representation may include one or more of a tree representation, a tabular representation, and the like. The user interface allows a user to specify a resource such as, for example, selecting a graphical representation of the resource or entering a reference for the resource. Once a resource is specified, information about that resource may be presented to the user. This information may include sub-resources, available methods, and the like. User interface 34 may obtain information for presentation to the user from model 36 for application 26, by sending request 46 to application 26, and the like.

Figure 2:
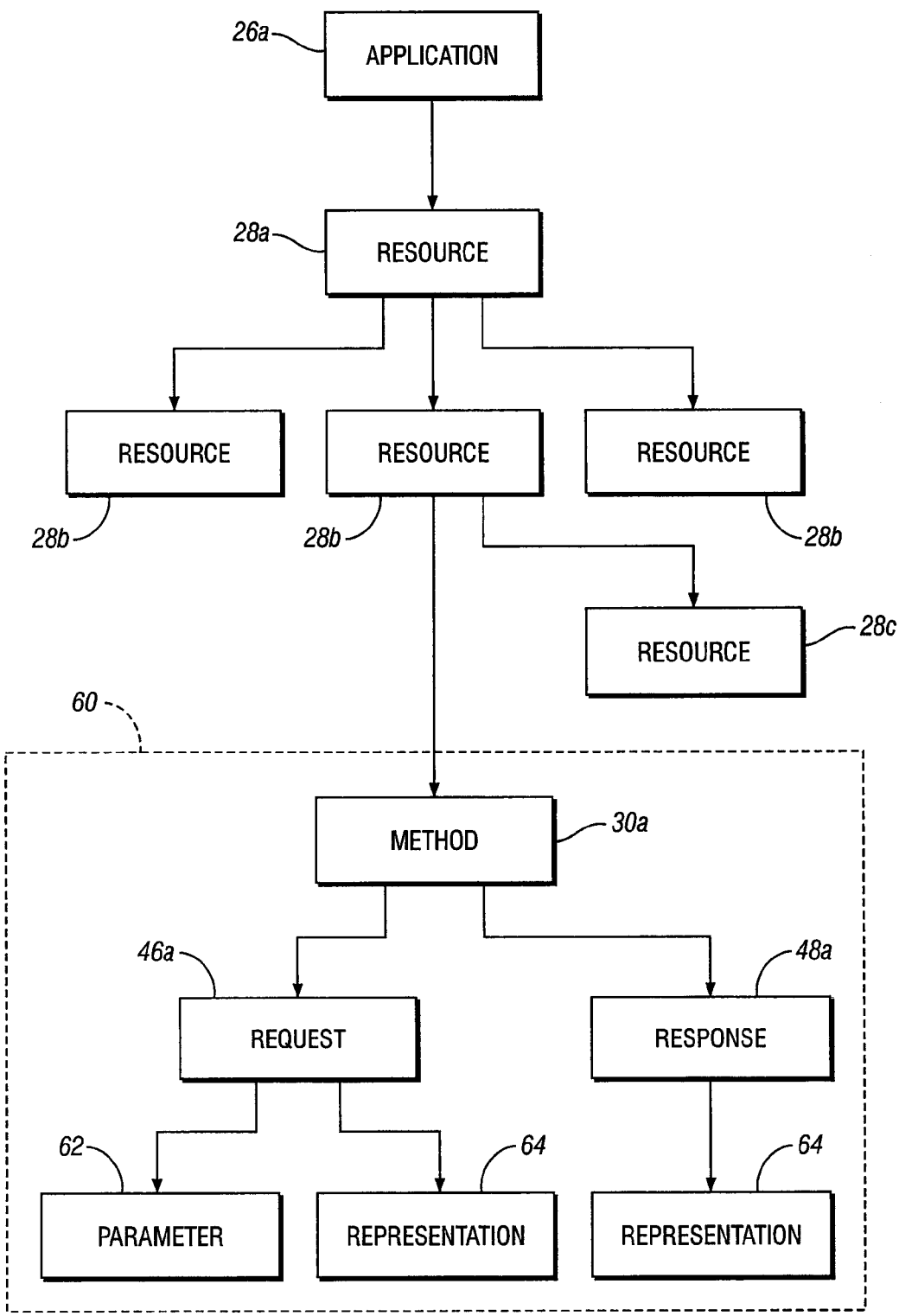
FIG. 2 is a schematic diagram of a model created according to an embodiment of the present invention.

Referring now to FIG. 2, a schematic diagram of a model created according to an embodiment of the present invention is shown. Model 36 includes application entry 26a, which reference root resource 28a created by the model builder.

Root resource 38a may reference one or more top-level resource entries 28b. Each top-level resource entry 28b may reference one or more sub-resource entries 28c. Sub-resources may also reference further sub resources.

Each resource entry 28b, 28c may include resource details 60. Resource details may include one or more method entries 30a. Each method entry 30a typically references request entry 46a and response entry 48a. Request entry 46a may reference one or more parameter entries 62 describing parameters included in a request and representation entry 64 describing representation format such as, for example, the supported MIME types and data schema. Response representation may include representation entry 64 describing the representation format expected in a response to the request.

Figure 3:
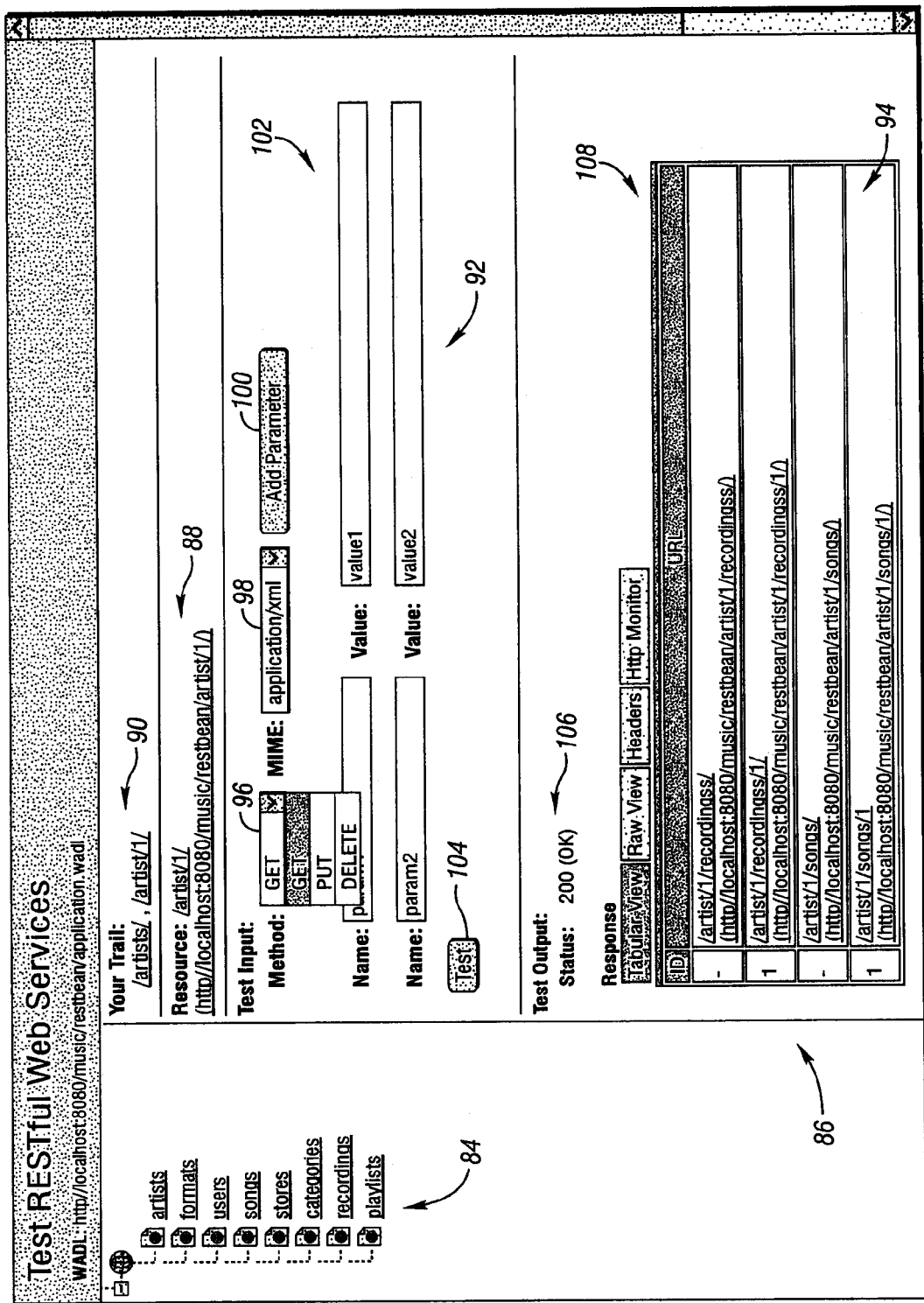
FIG. 3 is a schematic diagram illustrating a user interface screen according to an embodiment of the present invention.

Referring now to FIG. 3, a schematic diagram illustrating a user interface screen according to an embodiment of the present invention is shown. Display window 80 may be displayed on a screen. In one embodiment, display window 80 may be displayed within a web browser as is known in the art. Display window 80 includes location bar 82 into which a URL for an application.wadl file may be entered. Display window 80 also includes a navigator tool, shown generally by 84, which displays resources in a tree representation. Resources may be selected by clicking on a resource representation in navigator tool 84. In one embodiment, navigator tool 84 displays sub-resources for when a resource is selected.

Display window 80 includes a canvas area, shown generally by 86, that may change based on actions selected by the user. In the window shown, canvas area 86 includes a currently selected resource display, shown generally by 88, providing a URI for the currently selected resource. The currently selected resource may be manually entered, may be selected from navigator tool, may be selected from the results of a previous exploration, or the like. A trail display, shown generally by 90, indicates recently explored resources (e.g., "artists" and "artists/1").

Canvas area 86 includes a test input area, shown generally by 92, and a test output area, shown generally by 94. Test input area 92 includes method drop box 96 for selecting a method. Mime drop box 98 displays allowed mime types. In one embodiment, drop boxes 96, 98 are populated based on the currently selected resource and the application model. When appropriate, add parameter button 100 allows input boxes, shown generally by 102, to be added for inputting parameter names and values. When activated by a user, test button 104 automatically configures and transmits a request based on selections and entries in test input area 92. Data returned in a response is provided in test output area 94. A status indicator, shown generally by 106, indicates the results of the test. A response box, shown generally by 108, provides information returned in the response. Response box 108 can provide a variety of information in different formats. A tabular view lists information, such as sub-resources, in a table, from which the next resource may be selected by a user. A raw view presents the data in the format of the response such as, for example, plain text. A header view displays HTTP header information of an HTTP request. A monitor view displays traffic between the client and the server.

Figure 4:
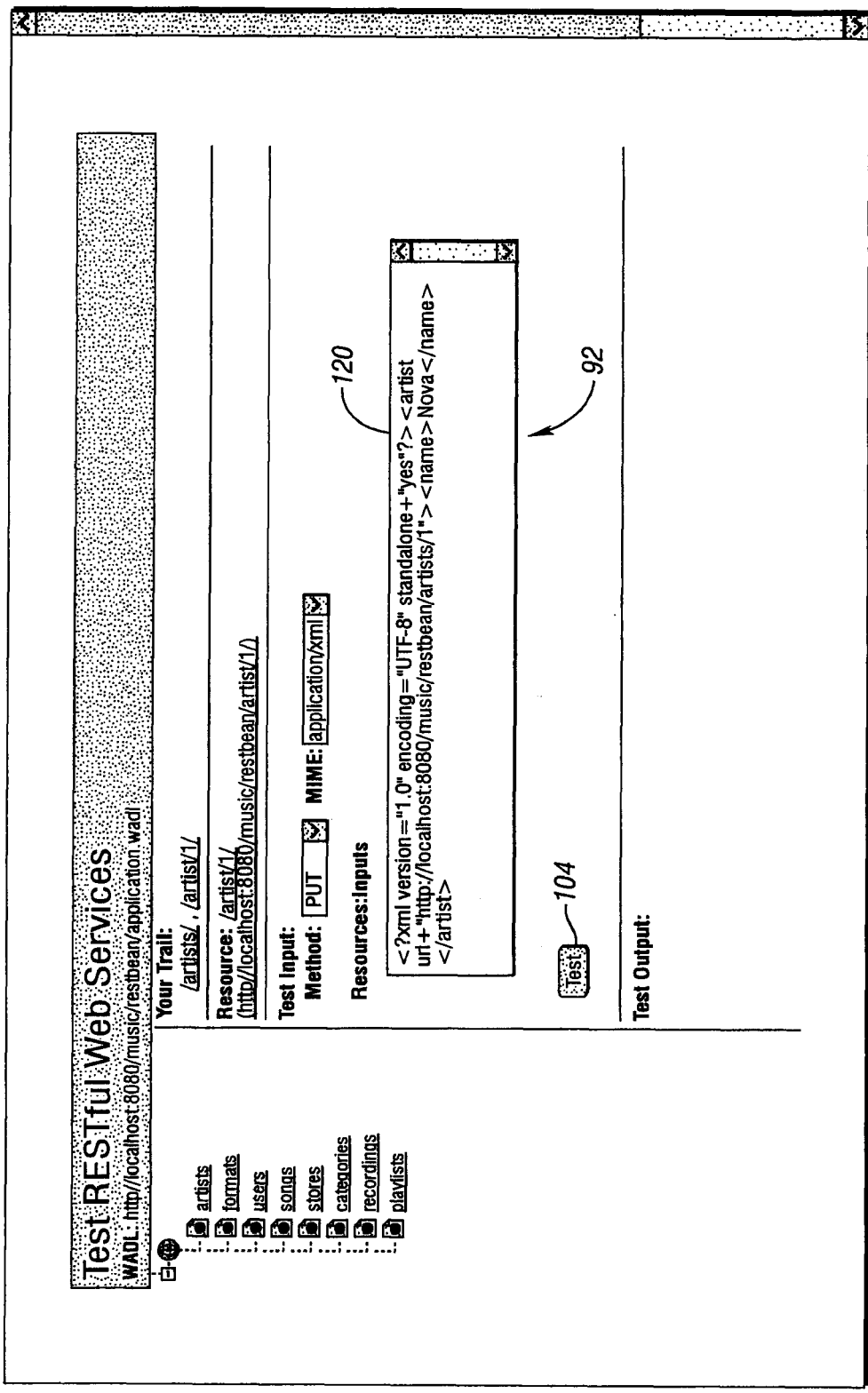
FIG. 4 is a schematic diagram illustrating another user interface screen according to an embodiment of the present invention.

Referring now to FIG. 4, a schematic diagram illustrating another user interface screen according to an embodiment of the present invention is shown. Test input area 92 of display window 80 includes resource input text box 120. In the example shown, text box 120 includes a text string for input to a put method. Once the text is entered and a user selects test button 104, a put request with the specified text string will be automatically generated and sent to the server.

Figure 5:
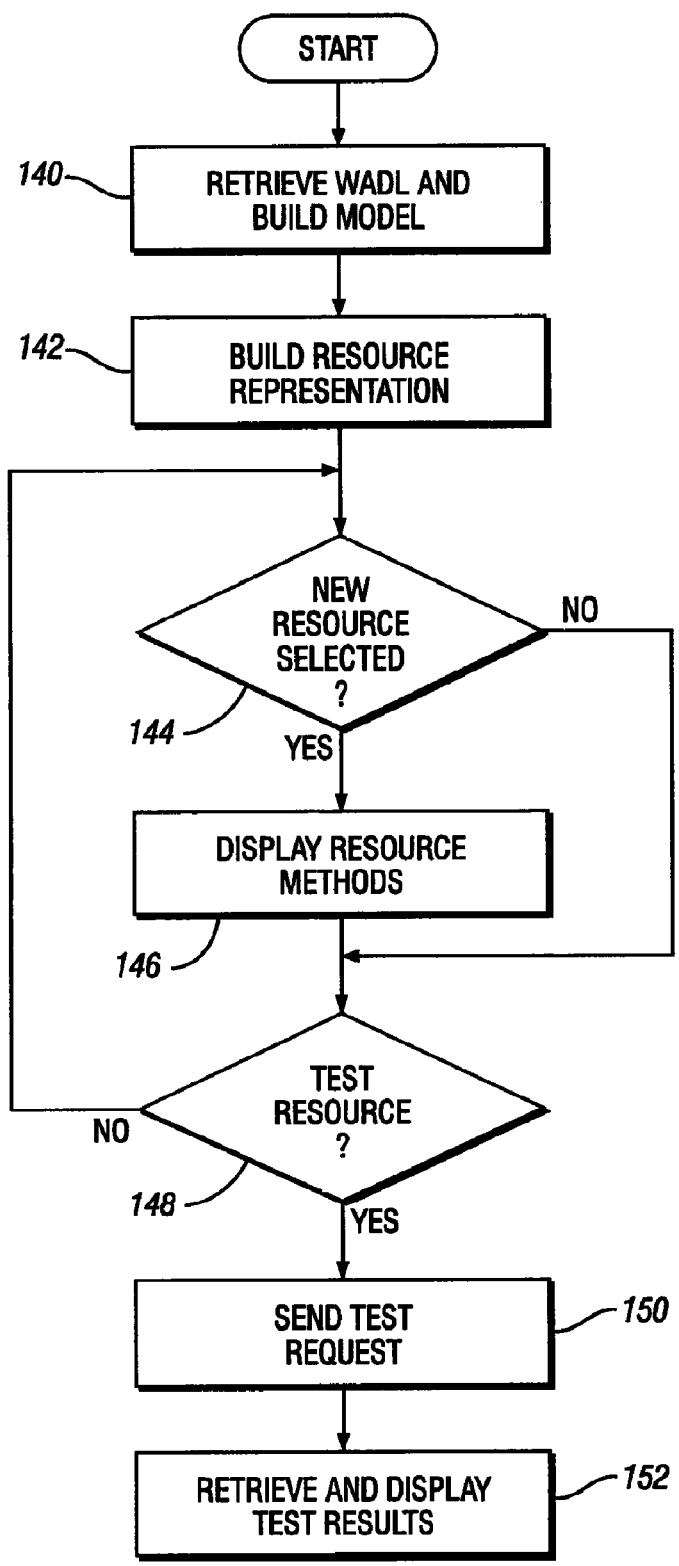
FIG. 5 is a flow diagram illustrating RESTful application exploration according to an embodiment of the present invention.

Referring now to FIG. 5, a flow diagram illustrating RESTful application exploration according to an embodiment of the present invention is shown. As will be appreciated by one of ordinary skill in the art, the operations illustrated are not necessarily sequential operations. The order of steps may be modified within the spirit and scope of the present invention and the order shown here is merely for logical presentation. Also, the method illustrated may be implemented by any combination of hardware, software, firmware, and the like, at one location or distributed. The present invention transcends any particular implementation and the embodiment is shown in sequential flow chart form for ease of illustration.

A WADL file for an application of interest is retrieved from a server and used to construct a model in computer memory, as in box 140. A representation of the application including the top-level resources is built and displayed on a user interface, as in box 142. A determination is made as to whether or not a new (or first) resource is selected by a user, as in block 144. If so, methods available for the selected resource are displayed, as in block 146. A determination is made as to whether or not a user has selected to test the selected resource, as in block 148. This test may include a selected method and input data associated with the selected method. If the selected resource is to be tested, a test request is automatically generated and sent to the server, as in block 150. A response to the request is received and test results displayed, as in block 152.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A client for analyzing resources of a Representational State Transfer (REST) application residing on a server, at least one of the resources supporting at least one method, the client comprising:
   a user interface for displaying a representation of at least one REST resource, for displaying a list of methods associated with each of the at least one REST resource, and for accepting user input specifying one of the REST resource methods;
   memory operative to hold a model of the REST application; and
   control logic in communication with the user interface and the memory, the control logic operative to automatically generate a request based on the specified method, send the request to the server, receive a response to the request from the server, and to display data received in the server response, the display including at least a raw view presenting the data in the format of the server response;
   wherein, if the received data includes additional REST resources, the user interface is operative to display a representation of at least one of the additional REST resources.

2. The client of claim 1 wherein the control logic is further operative to construct the model as a document object model of the REST application.

3. The client of claim 1 wherein the control logic is further operative to construct the model from a web application description language representation of the REST application.

4. The client of claim 1 wherein the method specified by user input is at least one of a post method, a get method, a put method, and a delete method.

5. The client of claim 1 wherein the user interface displays the representation of the at least one REST resource as at least one of a tree structure and a table.

6. The client of claim 1 wherein the user interface provides a graphical space into which the user can enter information for inclusion in the request sent to the server.

7. A computer implemented method of exploring a Representational State Transfer (REST) application residing on a server, the method comprising:
   constructing in computer memory a model of the REST application;
   displaying on a user interface a graphical representation of the REST application based on the model, the graphical representation providing at least one resource of the REST application;
   accepting user input specifying one of the at least one resource;
   displaying on the user interface at least one method associated with specified resource;
   accepting user input specifying one of the at least one displayed method;
   automatically sending a request to the server based on the specified method;
   receiving a response to the request from the server;
   displaying a representation of the response on the user interface, the display including at least a raw view presenting the data in the format of the server response; and
   if the received data includes additional REST resources, displaying a representation of at least one of the additional REST resources.

8. The method of claim 7 wherein the model is constructed as a document object model of the REST application.

9. The method of claim 7 wherein the model is constructed from a web application description language representation of the REST application.

10. The method of claim 7 wherein the method displayed on the user interface comprises at least one of a post method, a get method, a put method, and a delete method.

11. The method of claim 7 further comprising displaying the representation of the at least one REST resource as at least one of a tree structure and a table.

12. The method of claim 7 further comprising providing a graphical space into which the user can enter information for inclusion in the request sent to the server.

13. A computer readable storage medium containing instructions for execution on a computer, the computer operative to communicate with a server having a Representational State Transfer (REST) application, the computer readable storage medium comprising:
   computer code for constructing in computer memory a model of the REST application;
   computer code for displaying on a user interface a graphical representation of the REST application based on the model, the graphical representation providing at least one resource of the REST application;
   computer code for accepting user input specifying one of the at least one resource;
   computer code for displaying on the user interface at least one method associated with specified resource;
   computer code for accepting user input specifying one of the at least one displayed method;
   computer code for automatically sending a request to the server based on the specified method;
   computer code for receiving a response to the request from the server;

computer code for displaying a representation of the response on the user interface, the display including at least a raw view presenting the data in the format of the server response; and computer code for displaying a representation of at least one of an additional REST resources, if the received data includes additional REST resources.

14. The computer readable storage medium of claim 13 wherein the model is constructed as a document object model of the REST application.

15. The computer readable storage medium of claim 13 wherein the model is constructed from a web application description language representation of the REST application.

16. The computer readable storage medium of claim 13 wherein the method displayed on the user interface comprises at least one of a post method, a get method, a put method, and a delete method.

17. The computer readable storage medium of claim 13 further comprising computer code for displaying the representation of the at least one REST resource as at least one of a tree structure and a table.

18. The computer readable storage medium of claim 13 further comprising computer code for providing a graphical space into which the user can enter information for inclusion in the request sent to the server.

* * * * *